United States Patent [19]

Martin

[11] 4,051,484
[45] Sept. 27, 1977

[54] MAGNETIC PRINTER AND METHOD OF PERFORMING SAME

[76] Inventor: Samuel W. Martin, Martin Road, Weston, Conn. 06880

[21] Appl. No.: 628,499

[22] Filed: Nov. 3, 1975

[51] Int. Cl.² .......................................... G03G 19/00
[52] U.S. Cl. .................... 346/74.1; 156/584; 427/47
[58] Field of Search ............... 346/74.1; 118/623, 637, 118/638; 427/47; 235/61.12 M, 61.11 D, 61.9 R, 61.9 A; 101/DIG. 7, 426; 355/3 R, 3 DD; 156/230, 240, 277, 541, 584; 96/1.4

[56] References Cited

U.S. PATENT DOCUMENTS

| | | | |
|---|---|---|---|
| 3,631,838 | 1/1972 | Kushima | 118/637 |
| 3,678,897 | 7/1972 | Hewitt | 118/637 |
| 3,708,790 | 1/1973 | Nourigat | 346/74.1 |
| 3,899,381 | 8/1975 | O'Brien | 156/277 |
| 3,918,402 | 11/1975 | Ohta | 118/637 |
| 3,965,478 | 6/1976 | Schloemann | 346/74.1 |
| 3,966,534 | 6/1976 | Oddy | 156/584 |
| 3,974,796 | 8/1976 | Murray, Jr. | 118/637 |
| 3,987,491 | 10/1976 | Nelson | 346/74.1 |

*Primary Examiner*—Jay P. Lucas
*Attorney, Agent, or Firm*—Mattern, Ware, Davis & Stoltz

[57] ABSTRACT

A Universal Product Code (UPC) bar pattern printer comprises a loop of magnetizable recording tape moving at a constant speed past writing heads. The tape advances to a toner applicator incorporating a toner applicator drum having a surface incorporating a plurality of magnetic poles and a series of magnetizable wires parallel to the upper, longitudinal periphery of the drum. The wires and drum cause the toner material adhered to the drum to form rotating helical ridges of toner along the upper periphery of the wires. The magnetized recording tape makes physical contact with and is swept by these ridges to form a toner deposited image on the recording tape. This image is enhanced by cleaning with a sheet of air from an air knife and transferred to a label. The label is synchronously peeled from its backing and then fused by a heater. The label may then be replaced on a label backing strip for application to a package. The recording tape is readied for re-writing by de-magnetization and sapphire knife removal of all residual material. Timing sensors and circuitry ensure highly accurate bar width as well as registration and centering of the bar code pattern on the label. The module width of the bar pattern is chosen to be an integral multiple of the average magnetic agglomerate diameter of toner agglomerates formed by the magnetic toner applicator. The same integral number of flux reversals are laid down on the magnetic tape to print a module. A timing capstan driven by the magnetic tape controls the flux reversals to insure highly accurate printing.

31 Claims, 16 Drawing Figures

MAGNETIC PRINTER AND METHOD OF PERFORMING SAME

BACKGROUND OF THE INVENTION

1. Field of the Invention

The present invention relates to magnetic printers and in particular to magnetic printers for generating machine and man-readable printed bar patterns on labels and other permanent recording mediums for use as a computer input, such as in grocery product coding.

2. Description of the Prior Art

The concept of magnetic printing, sometimes called ferromagnetography has existed for over 25 years but has been fraught with problems including generating a magnetized image on a magnetizable recording material, selectively placing a visible material on the magnetized portions of the recording media ("toning"), and transferring this visible material image to a permanent medium such as paper. Prior art devices have overcome or substantially reduced several of these problems and provided printers of reasonable quality. However, most of these printers have been expensive and have not been able to produce highly accurate printing. Such printing is imperative in the field of bar pattern coding for automatic grocery checkout systems.

Some of these problems, such as the writing of information onto a recording tape, have been successfully dealt with; such as disclosed in U.S. Pat. No. 3,735,416, entitled "Magnetic Printing System", U.S. Pat. No. 3,254,626 entitled "High Speed Letter Printing System" and U.S. Pat. No. 2,986,608 entitled "Magnetic Recording Cross-Talk Elimination" wherein the proper generation of a small magnetized area on a recording tape has been achieved with the elimination of unwanted magnetizing of adjacent areas. However, the generation of bars of varying width and uniform blackness has not been successfully achieved.

Also, the fixing of toner material on a recording medium, such as a paper sheet, has been substantially solved. The solution is the use of a toner comprising a powder containing small particles of magnetizable material surrounded by a heat fusible resin, wherein the resin is fused to the recording medium by a heater, such as a radiant heater. However, the printing of labels on a backing strip has remained a problem with such fusing or fixing devices since the backing strip must also be heated. Close placement of labels is also not possible unless the backing strip reverses direction after placement within the heater. The present invention overcomes this problem by peeling the label from the backing strip prior to the fusing operation.

Another problem is the application of the toner to the magnetized area of the recording tape. Typically, because the toner is a powder consisting of a magnetized material imbedded within a heat fusible resin, the application of this toner to the recording tape has presented difficulty in obtaining a clear, sharp image consisting of toner fully applied to magnetized regions of the tape and not applied to unmagnetized regions. In U.S. Pat. No. 3,735,416, entitled "Magnetic Printing Systems," a toner applicator/cleaner is disclosed using rotating bristles for transferring toner particles from a reservoir to an aperture over which the recording tape passes. However, the use of rotating bristles has the problem of not always applying a uniform and adequate amount of toner to the recording tape.

In U.S. Pat. No. 3,859,959, entitled "Magnetic Toner Applicator," a toner ring of magnetic material transports toner material to an aperture having an inclined edge where the toner impinges or the edge or "dam" and builds so as to more evenly apply the toner to a passing recording tape. However, if the magnetized recording tape comes too close to the magnetic toner ring, the magnetic field of the ring may deform the magnetic pattern on the tape; thus degrading or ruining the data to be printed. Also in U.S. Pat. No. 3,392,432, entitled "Magnetic Roller for Electrophotographic Development," a magnetic roller is disclosed for applying toner powder to a latent electrostatic image by using magnetizable carrier particles. Because the roller is used with electrostatic latent images, the close proximity of the roller to the latent image will not distort the image. Such close proximity could seriously deteriorate the magnetic latent image of the recording tape in a magnetic printer. Furthermore, the disclosed switchable magnetic field on the periphery of the roller in the '432 patent would have no apparent beneficial practical effect for magnetic printing since magnetic printers typically use a differnt type of toner mixture.

The basic problem in toning is to closely expose the magnetic latent image to a large number of toner particles having random magnetic orientations so that some will have the proper orientation and magnetically adhere to the latent image. Thus, the uniform, clean, sharp deposition of toner to the magnetized portion of the recording tape has remained a problem even when printing text. More importantly a sharp, clear deposition of toner is imperative in bar pattern coding used in the grocery industry for automatic checkout. Here, a bar pattern of light and dark bars is used as a computer input for generating twelve digits that identify the product to be sold. The bar pattern is scanned with a light wand or a laser scanner. The reflected light from a spot ranging from 0.005 to 0.008 inch in diameter as the wand or scanner crosses the pattern generates, by a photosensitive device, a voltage proportional to the light and dark bars. Any void in the dark bars or spots in the light bars could alter the reflected light to the extent that a false digit is read by the computer.

The present invention overcomes these problems in the prior art by providing a toner applicator incorporating a revolving longitudinally disposed toner drum having an outer permanently magnetized periphery consisting of magnetic poles arranged in a helical or other pattern about the periphery of the drum. This polar magnetic surface attracts toner particles form a toner reservoir, forming a toner layer. The rotating drum thus transports the toner around its entire outer periphery. The recording tape approaches and is spaced from the uppermost region of the rotating drum. Between the tape and the toner drum there is a plurality of magnetizable wires that magnetically and mechanically interact with the toner layer to form sweeping ridges of toner about each of the wires. These ridges form a fluidized magnetic toner bed between the wires and the tape for efficient transferral of the toner to the magnetized region of the recording tape. The toner particles within this fluidized bed of ridges are in vigorous random motion and many of them are easily attracted to the magnetized regions of the recording tape so as to form a pattern of toner corresponding to the previously recorded magnetic image written on the recording tape by the recording heads.

Electrically charged wires have been used in electrostatic printers. These wires are used for electrostatically charging a sheet of paper to assist the transfer of a toner image from a photoconductor element to the paper. The wires do not form magnetic fields for forming ridges of magnetic toner, but only electrostatically charge a piece of paper so that the paper can electrostatically capture a toner image on a photoconductor element. The magnetizable wires of the present invention do not have any electrical potential impressed on them and they are not used to electrostatically charge a sheet of paper. Thus, although prior art devices, such as U.S. Pat. No. 3,620,617, entitled "Electrophotographic Apparatus with Improved Toner Transfer," use wires to promote toner transfer, these prior art devices are concerned with an entirely different type of toner transfer and in no way suggest or disclose the use of magnetizable wires in applying toner to magnetized regions of a magnetic recording tape or other magnetic recording medium.

Excess toner particles that inadvertently, mechanically adhere to the recording tape in regions that are not magnetized, that adhere to toner particles adhering to magnetized regions, are easily removed by use of an air knife of this invention blowing a sheet of air at an acute angle at the recording tape. The transfer of the recorded toner image on the recording tape to a label is accomplished by properly synchronizing the actuation of pinch rollers so as to transfer the image to pressure sensitive labels at the correct time. This insures proper registration of the image onto the label. The label or other pressure sensitive paper is synchronously removed from its paper backing and transferred to a conveyor passing through a heater to fuse the toner to the label. The label may then be re-applied to the backing strip for use in applying the label to packages.

SUMMARY OF THE INVENTION

Magnetic printers according to the present invention incorporate a continuous loop of recording tape on which data to be printed is magnetically recorded by means of writing heads. In a preferred embodiment of the present invention, the labels to be printed correspond to the Universal Product Code (UPC) presently used and contemplated for further use in automated checkout at grocery stores, as well as possible further use in department stores and other consumer oriented areas. Following the magnetic writing of the information on the recording tape, the tape passes over a new and unique toner applicator wherein a toner incorporating magnetic particles surrounded by a heat fusible resin are efficiently applied to the tape so as to adhere to the tape completely over all magnetized regions corresponding to the image to be printed. This toner applicator is capable of applying toner to any type of electromagnetic latent image, e.g. xerography, regardless of the means employed to create the image. The toner applicator incorporates a toner reservoir and a pair of rotating toner applicator drums for transfer of the toner to a region where it can be applied to the passing recording tape. The upper toner drum has an outer magnetized periphery consisting of magnetic poles arranged in a helical pattern. The North-South poles of a plurality of sheet like magnets are arranged in a helical pattern and have short non-magnetic spaces between the corresponding North and South poles of adjacent magnets. Spaced above the upper toner applicator drum and parallel to the longitudinal axis of the drum is a series of parallel magnetizable wires which greatly enhances the application of the toner to the magnetized areas of the recording tape. The toner, that adheres to the outer periphery of the toner drum's magnetic surface tends to form varying helical ridges above each of the wires throughout their length due to the electromagnetic field induced by the revolving toner applicator drum with respect to the wires. Due to the motion of the drum and its magnetic periphery, the toner ridges or higher density areas appear to rotate about each wire. Since the wires make physical contact with the toner layer on the upper drum, these toner ridges sweep about the upper angular quadrant of the wires to greatly enhance the application of toner to the tape. Each of the toner ridges movingly impinges along the entire lower surface of the moving recording tape, and through the mechanical interaction of the tape generates a fluidized bed of toner at a pressure of approximately one atmosphere. Due to the sweeping action of the toner ridges, this bed of randomized toner squeezes against the tape. In places where the tape is magnetized, a series of toner particles is pulled from the ridges and applied to the recording tape. Due to the plurality of ridges, the removal of toner particles from one ridge does not adversely affect the deposition of toner to the next portion of recording tape, since there are other ridges for applying the toner particles, as well as the continual replenishment of these ridges by more toner particles due to the rotational movement of the upper toner applicator drum.

The tonerized image on the recording tape is then cleaned by an air knife directing a sheet of air at the tape at an acute angle. This air flow removes toner particles that bridge across unmagnetized areas of the tape as well as toner buildup atop toner particles adhering to magnetized regions of the tape.

Following the deposition of toner to the areas on the recording tape corresponding to data to be printed, the recording tape passes between a transfer area having a transfer pinch roller wherein the toner particles are transferred to a label or similar material by proper actuation of the transfer roller when the recorded toner image approaches the area. At the same time a label is properly registered with this image so that the transferred image is properly centered upon the label. The proper synchronization and registration of both the recorded toner image on the tape and the label as they jointly pass on alternate sides of the transfer area rollers is accomplished through synchronizing signals obtained from the motion of both the recording tape and the motion of the backing strip to which the labels are attached. Once the recorded image is transferred to the label, the label is removed from its backing strip by passing the backing strip over a small radius roller, which may be the transfer pinch roller, or over a sharp edged region. The label is then transferred to a conveyor belt that passes the label through a heater, typically a radiant-type heater, wherein the heat fusible resins are heated to a temperature sufficient to melt and affix them to the label, thus forming a permanent recording of the desired data on the label. The label may then be transferred back to the paper backing strip through use of a pair of pinch rollers where it can be used for purposes such as application to food packages.

Meanwhile, the recording tape loop continues its movement and is de-magnetized in a manner that reclaims any residual toner particles. Furthermore, any residual matter remaining on the tape is physically removed by a sapphire knife. This region of the recording tape, which was previously recorded with a desired image, may be re-recorded with the same data or any other desired data.

Furthermore, the present invention incorporates a label counting device wherein the same information may be generated on a series of labels through the re-writing of th same information along different regions of the recording tape and the proper synchronization of the label drive mechanism so that each of the recorded toner images on the recording tape is transferred to a consecutive label.

The inputting of data to the writing heads may be generated from a manually operated keyboard or from an automatic data generator coupled to another device, such as a meat scale. In the latter case, the data corresponding to the weighed item is automatically generated, encoded, and transferred to the writing heads forming a magnetized image on the recording tape. The toner is applied thereto and ultimately transferred to the label for application to the produce or meat weighed on the scale.

Thus, the present invention provides a small, magnetic printer for use in many applications where size, reliability and highly accurate printing are paramount. The printer can be coupled to existing equipment for the automatic generation of data or it can be coupled to a keyboard for manually generating such data. The printer can generate printed labels that are relatively smudge and smear proof and highly abrasive resistant.

OBJECTS OF THE INVENTION

Therefore, it is a principal object of the present invention to provide a magnetic printer incorporating a toner applicator that efficiently and completely deposits toner material to magnetized areas of a recording tape so as to generate a toner image precisely corresponding to this magnetized area on the toner tape which, after cleaning by an air knife is easily transferrable to a medium such as a label;

Another object of the present invention is to provide a magnetic printer of the above description wherein the recording tape is in the form of a loop moving at a constant speed and wherein a label backing strip containing a plurality of labels spaced thereon is synchronized with the movement and recording of data on the recording tape so that proper registration and centering of the recorded toner image on the label is obtained;

A further object of the present invention is to provide a magnetic printer of the above description having an air knife disposed with respect to the moving recording tape at an angle so as to remove toner particles which are loosely adhered to the recording tape following passage of the recording tape by the toner applicator;

Another object of the present invention is to provide a toner applicator incorporating a toner applicator drum having a periphery comprising magnetic dipoles arranged in a helical or other patterns with respect to the longitudinal axis of the toner drum so as to induce alternating magnetic fields in a series of parallel wires spaced about a portion of the toner drum and disposed between the toner drum and the passing recording tape so that the toner layer on the toner drum forms rotating ridges about the upper periphery of the wires so as to sweep across the lower surface of the recording tape and thereby insure the complete and voidless deposition of toner particles to magnetized areas of the recording tape;

An additional object of the present invention is to provide a toner applicator as mentioned above that generates toner aglomerates and magnetic loops of toner particles larger than individual toner particles;

A further object of the present invention is to provide a magnetic printer of the above description which is small, economical and reliable and therefor usable for many computer input applications, including inventory control, identification, and the generation of Universal Product Code bar pattern labels in supermarkets for produce, meat and related items;

Other objects of the invention will in part be obvious and will in part appear hereinafter.

The invention accordingly comprises the features of construction, combinations of elements, and arrangement of parts which will be exemplified in the construction hereinafter set forth, and the scope of the invention will be indicated in the Claims.

THE DRAWINGS

For a fuller understanding of the nature and objects of the invention, reference should be had to the following detailed description taken in connection with the accompanying drawings. The same reference numbers refer to the same elements throughout the several views of the drawings.

DETAILED DESCRIPTION

Figure 1:
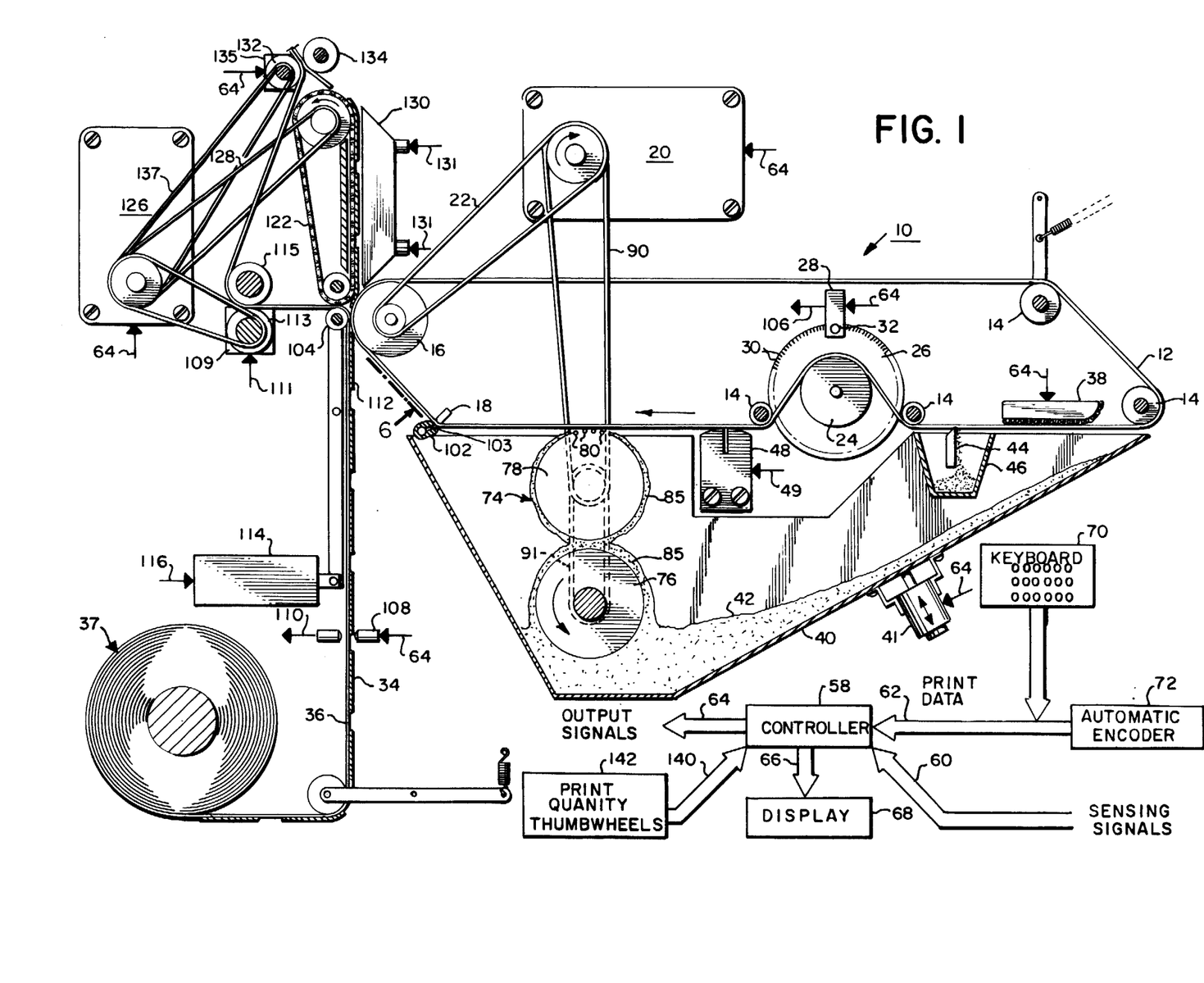
FIG. 1 is a diagrammatic view of the magnetic printer according to the present invention.
Figures 2, 3, 4, 5A, 6B, 7:
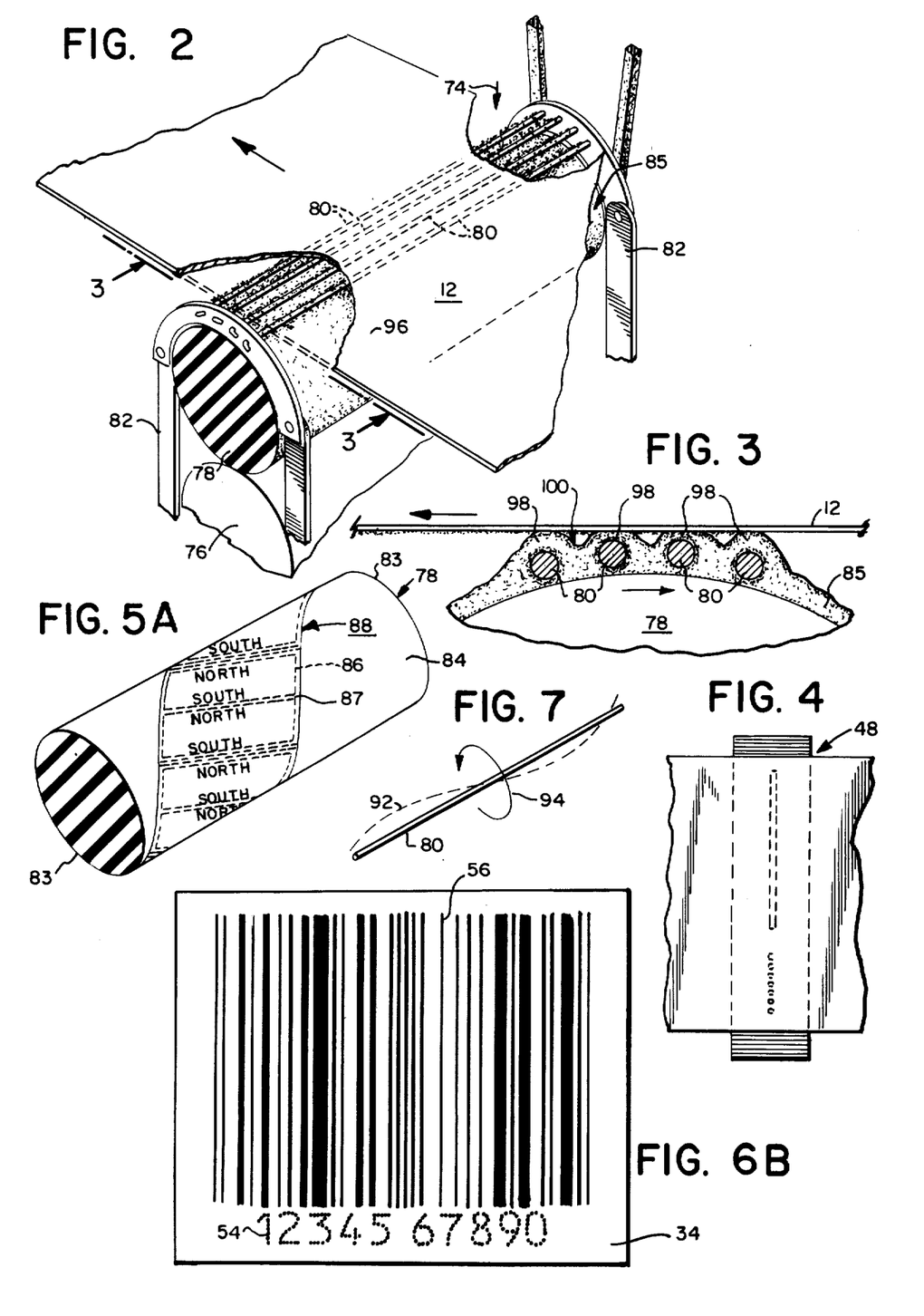
FIG. 2 is a perspective, partly cutaway view of an upper toner drum, toner applicator enhancing magnetizable wires, and corresponding portion of the recording tape loop of the printer of FIG. 1, illustrating the physical contact of the recording tape with the ridges of toner material generated above each of the toner applicator enhancing wires.
FIG. 3 is an enlarged cross-sectional view of the upper toner drum, magnetizable wires, and recording tape of the present invention taken along lines 3—3 of FIG. 2, illustrating the contact between the toner ridges and a corresponding portion of the recording tape loop.
FIG. 4 is a top plan view of the magnetic writer of the magnetic printer shown in FIG. 1, illustrating the passage of the recording tape loop over the writing heads of the writer.
FIG. 5A is a perspective view of the upper toner applicator drum diagrammatically illustrating the invisible magnetic dipoles arranged about the periphery of the drum in a helical pattern.
FIG. 6B is an enlarged top plan view of a printed bar pattern and man-readable label formed by the magnetic printer of FIG. 1.
FIG. 7 is a perspective view of one of the magnetizable wires of the toner applicator of the present invention, diagrammatically illustrating the induced magnetic field about the wire and the field's direction of rotation generated by rotation of the upper toner drum.

A best seen in FIG. 1, a magnetic printer 10 according to the present invention in its preferred embodiment is designed for printing labels containing machine-readable bar patterns and man-readable digits in compliance with the Uniform Grocery Product Code Council's Uniform Product Code (UPC). The actual code is fully described in a document entitled UPC Symbol Specification, May 1973, compiled and written by the Distribution Number Bank. A sample of a bar pattern, otherwise known as a symbol, in conformance with the UPC requirements is shown in FIG. 6B.

As stated in the above mentioned UPC Symbol Specification, each bar pattern represents 12 numbers, wherein the first number indicates one of a plurality of usable number systems. This number system causes the subsequent ten numbers to be interpreted in a specified manner. The following ten numbers form a 10-digit code wherein the first five numbers typically indicate the manufacturer's identity and the remaining five digits indicate the particular item and its price. The twelfth digit is a modulo-10 check digit which insures that the preceding 11 digits are correctly interpreted by the machine that reads the symbol.

Figure 6A:
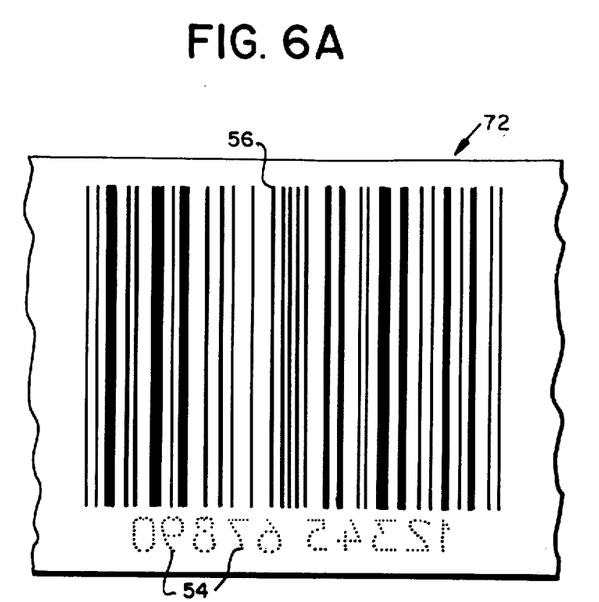
FIG. 6A is an enlarged view of the recording tape taken along lines 6—6 in FIG. 1, illustrating the deposition of toner particles on the recording tape prior to transferral to a label of the present invention.

Each of the numbers is represented in man-readable form as shown in mirror image at the bottom portion of FIG. 6A as well as in a series of light and dark bars, the width of the light and dark bars varying from 0.012 to 0.048 inch. The minimum width of a bar, that is 0.012, is known as a module, and it is imperative that the module widths be constant for an entire bar pattern or symbol. A typical bar pattern consists of 30 light modules and 29 dark modules. Due to the module width constraints, the writing of information by the magnetic printer must be accurately timed.

The bar patterns are typically placed on grocery items and are read by a light wand or laser scanner. A computer then interprets the number, checks the modulo-10 check digit, looks up the price for the item in the computer memory, displays the price to the customer, prints the description and price of the item on a sales slip, and deducts the item from a running inventory of the store.

The importance of accurate printing can be better appreciated by considering the computer input obtained by scanning the bar pattern with the light wand or laser scanner. The reflected light from a spot ranging from 0.005 to 0.008 inch in diameter as the wand or scanner crosses the pattern generates a voltage proportional to the light and dark bars. Any void in the dark bars or spots in the light bars could alter the reflected light to the extent that a false data is read by the computer.

Although most items sold in grocery stores have pre-labeled patterns on the package, many items such as meats, delicatessen goods, and fresh vegetables must be coded at the grocery store since the unit of measure is not known until the customer makes his choice. Therefore, it is necessary that grocery stores have the capability of printing a UPC symbol label along with the usual price label on such items at the time of packaging in order to obtain a 100 percent automatic checkout capability.

The present invention as shown in FIG. 1 is capable of achieving this desired result by providing a magnetic printer for generating bar pattern labels corresponding to coded information derived at the time of the customer's selection of the item. Thus, in a situation where a customer is purchasing a cut of meat, the UPC label is printed at the same time as the article is weighed on a scale. Similarly, when a crate of fresh vegetables is obtained, each of the individual vegetables may be individually labeled by generating a group of UPC labels corresponding to the particular price and code for the vegetable.

The overall operation of the present magnetic printer is best seen in FIG. 1. A magnetic recording medium, such as a loop of magnetic recording tape 12 having a width in excess of the UPC bar code width, which in this instance is 0.900 inch for the bars and approximately 0.108 inch for the overall man-readable numbers, is guided along a series of rollers 14, a drive capstan 16, an arcuate corner 18, and a timing capstan 24, by the capstan 16 as driven by motor 20 through conveyor 22. The timing capstan 24 is interposed along the length of the tape loop 12 and causes a timing disc 26 to rotate at an angular velocity proportional to the tape speed. The timing disc is coupled to an optical sensor 28 which generates timing pulses corresponding to the passage of timing slits 30 through optical path 32. In the preferred embodiment of the present invention, there are 500 timing slits on the timing disc which at the typical tape speed of 8 inches per second generates 2,000 timing pulses per second or one pluse per 0.004 of tape movement. The timing information is utilized by the present invention to ensure that the writing of the bar patterns onto the magnetic tape loop is properly synchronized to insure the proper width spacing of each of the modules that comprise each light or dark bar, regardless of minor variations in the tape speed. Furthermore, the timing information is coupled with timing information regarding the location of labels 34 on a backing strip 36 to insure proper registration and centering of the data to be printed on the label from the magnetic tape loop, as will be described infra. The remaining labels are stored with the backing strip on a spool 37.

In order to insure that the information to be magnetically written onto the magnetic tape loop will be of the best possible quality, the magnetic tape 12 is first de-magnetized by de-magnetizing head 38 where residual toner particles are removed and fall into a toner reservoir 40. The toner 42 typically is composed of microscopic particles having a size of from 5 to 13 microns consisting of a magnetizable center portion and a heat fusable resin surrounding the magnetizable portion.

Following de-magnetization of the tape loop, residual dirt and dust particles may still be adhered to the tape and are removed by a sapphire knife 44 which physically wipes the tape to remove these particles. These particles are collected in a trough 46 for later disposal.

As best seen in FIGS. 1 and 4, a magnetic writer 48 comprises a single longitudinally disposed write head 50 and a line of seven matrix write heads 52. The longitudinal write head 50 has a length equal to the desired bar length and has a peferred width of approximately 0.004 inch. The matrix write heads 52 generate the man-readable characters 54 (FIG. 6B) through selective energization forming a matrix of dots corresponding to the desired digit. The tape loop is magnetically imprinted or written with the desired UPC symbol by causing the respective write heads 52 and 54 to undergo a series of flux reversals at each region where information is to be printed. Thus, in generating a narrow bar, such as a 0.012 bar denoted by bar 56 (see FIG. 6) the longitudinal write head undergoes three flux reversals 0.004 inches apart from each other to thereby imprint upon the magnetic tape three magnetic flux reversal lines corresponding in width to the line shown by bar 56. These three flux reversals are stored by the magnetic tape and correspond to the size of the toner agglomerates to be applied thereto, as will be discussed infra. The inputting of data to the magnetic writer 48 is generated by a controller 58 which, as explained infra, receives sensing signals 60, print data 62, and print quantity sensing signals 63 so as to generate output signals 64 which control the entire magnetic printer 10. The controller also generates data display signals 66 for driving a display 68. The print data 62 may be generated by a keyboard 70 or by an automatic encoding device 72 which may be coupled to a weighing device (not shown) used for weighing produce, meats, or delicatessen items.

Following the magnetic writing of data onto the tape loop, the tape preferably quickly encounters a toner applicator shown generally as 74 for the depositing of toner particles to the magnetized portions of the tape loop.

As best seen in FIGS. 1 and 2, the toner applicator 74 comprises a lower toner drum 76, an upper toner drum 78, the toner reservoir 40 and toner therein 42, as well as magnetizable wires 80 and frame structure 82. A conveyor belt 90 drives the upper toner drum, which in turn drives the lower toner drum by belt 91.

Figures 5B, 5C, 12:
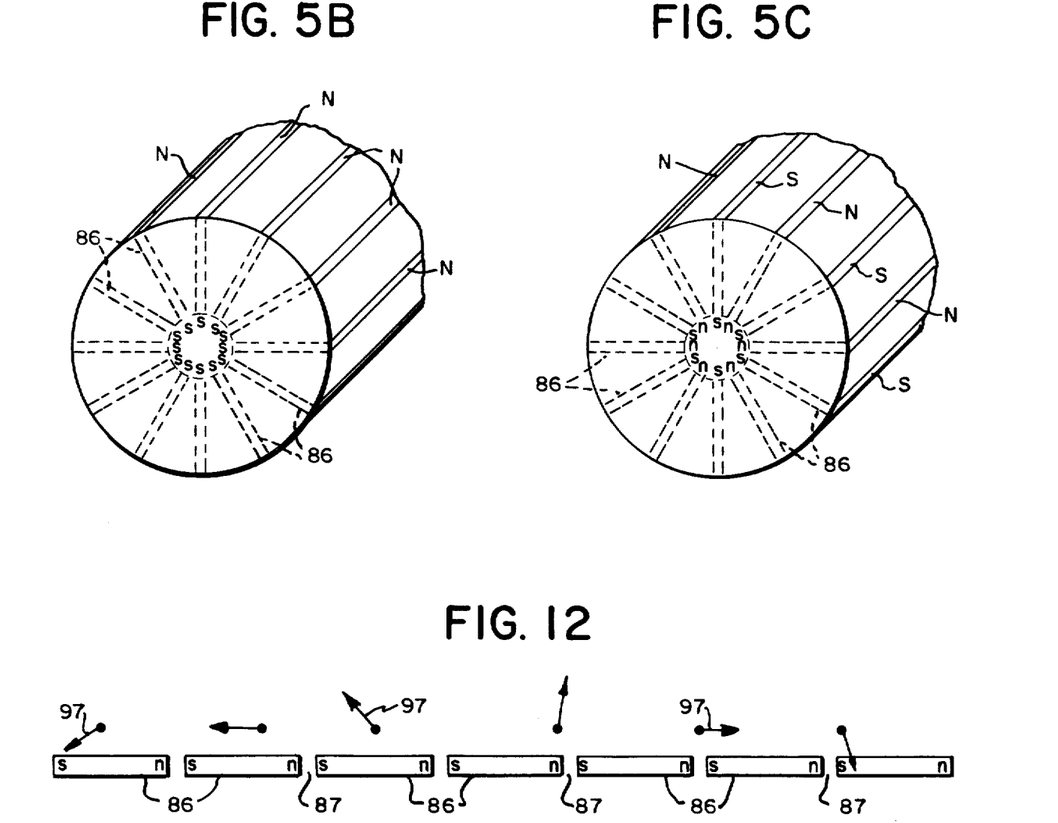
FIG. 5B is a perspective view of an alternate embodiment of the upper toner drum, diagrammatically illustrating the use of radially extending magnets having one polarity at the center of the drum and one polarity at the periphery of the drum.
FIG. 5C is a perspective view of a second alternate embodiment of the upper toner drum diagrammatically illustrating the use of radially extending, alternate polarity, magnets.
FIG. 12 is a diagrammatic representation of the direction and magnitude of the induced magnetic field about a given point on one of the toner applicator enhancing magnetizable wires depending upon the orientation of the wire with respect to magnets placed on the periphery of the toner applicator drum as shown in FIG. 5A.

As best seen in FIGS. 1, 2 and 5, the lower and upper toner drums may be composed of an inner non-magnetizable substance as rubber and an outer periphery having a magnetized surface 84 for attracting toner layer 85 from toner reservoir 40. It should be noted however, that the toner drums may be composed of solid magnetic material such as an array of radially extending magnets shown in FIG. 5B or an array of radially extending magnets having both polarities at the surface, as shown in FIG. 5C.

Lower toner drum 78 attracts the toner layer 85 by rotation through toner bed 42. The toner bed is maintained in a uniform state by periodic tapping of the reservoir 40 by tamper 41. Tamper 41 is driven by controller 58 through output signal 64. The lower toner drum transfers toner to the upper drum to form a second toner layer 85.

As best seen in FIG. 5A, in the preferred embodiment of the present invention the magnetized surface of the upper toner drum comprises a series of sheet magnets 86 arranged about the periphery in a helical fashion. Between the adjacent magnets are non-magnetized spaces 87. For a typical upper toner drum having a longitudinal width of 1.2 inches the magnets may be wrapped around a rubber periphery of the drum and incorporated in a magnetic strip of approximately 1 inch in width. The helical wrapping of the magnetic strip 88 about the toner drum insures that the entire periphery of the drum is magnetized except for non-magnetized spaces 87. As will be explained below, the helical arrangement of sheet magnets enhances the application of toner from the drum to the magnetic portions of the tape.

It should be noted that it is not necessary that the magnets be arranged in a helical pattern about the drum's surface but that they may have any other arrangement. Furthermore, the magnetized surface may have only one polarity; provided that, the magnetic field extending outwardly from the upper toner drum is non-uniform for any given point in proximity to the drum. Thus, the only requirement for the magnetized surface is that it have a non-uniform magnetic field emanating therefrom.

The magnetizable wires 80, which preferably are steel piano wires, are physically secured to the frame structure 82 and are spaced about the upper periphery of the toner drum 78 in a parallel fashion to both the longitudinal axis of the toner drum, as well as to each other. The wires are preferably spaced from each other at a distance equal to the perpendicular length between North and South poles of a sheet magnet. When the magnets 86 are arranged in a helical pattern, rotation of the upper drum by a motor 20 generates a time and spacially variant magnetic field along the length of each wire. The magnetic field generated along the wire revolves around the wire in a direction opposite to the rotation of the upper toner drum. The magnetic field about each of the magnetizable wires 80 is thus in the shape of a helix having a time variant magnitude that is strongest when a point on the wire is directly above a North or South pole and weakest when the point is directly above the mid-point of a non-magnetized space 87 between adjacent dipoles 86. The orientation of the magnetic field is dependent upon the spacial relationship of the closest magnetic dipole under the particular section of the wire. As the upper toner drum rotates, this helix also rotates in a direction opposite to the rotation of the upper toner drum. A visualization of the invisible magnetic field is shown in FIG. 7, where line 92 represents the invisible magnetic field about a single wire 80 at a particular instant of time. Arrow 94 indicates a counter clockwise rotation of this magnetic helix for the clockwise rotation of upper toner drum 78.

As is best seen in FIG. 12, for any given point on a wire, the magnitude and direction of the induced magnetic field is dependent upon the wire's position with respect to the nearest magnet. As is clearly evident by North magnetic vectors 97, the magnitude of this induced field is greatest when the wire is over a pole and weakest when the wire is at the mid-point of the space 87. The direction of the induced magnetic field also changes rapidly, as the space 87 moves under a wire.

Figure 13:
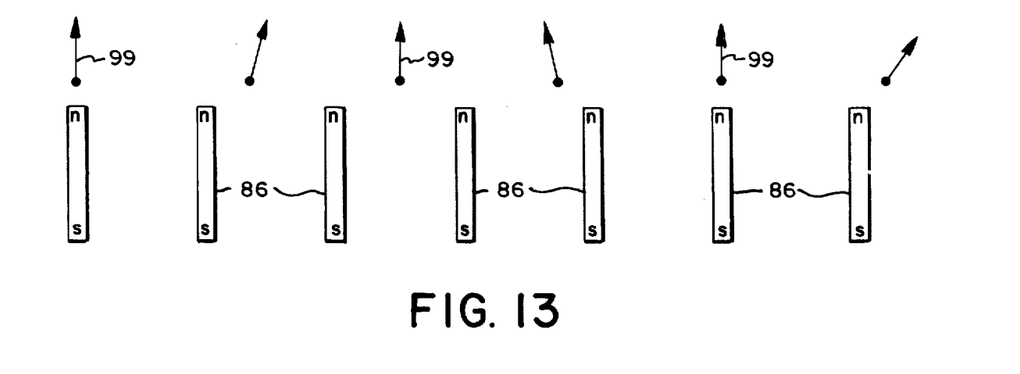
FIG. 13 is a diagrammatic representation of the direction and magnitude of the induced magnetic field about a wire as shown in FIG. 12, for magnets arranged on the toner drum as shown in FIG. 5B.

If the toner drum magnetic surface comprises radially extending sheet magnets as shown in FIG. 5B, the induced magnetic field in a wire is that shown by North magnetic vectors 99 in FIG. 13. It is there seen that the induced field does not completely rotate, but sweeps back and forth along the upper quadrant of the wire. The magnitude also varies with the strongest field at the point where the wire is above a pole and the weakest field where the wire is at a mid-point of two poles. A similar induced field results if the sheet magnets of FIG. 5A are positioned so that their North and South poles are parallel to the ends 83 of upper toner drum 78.

If the toner drum magnetic surface comprises radially extending magnets of alternate outer polarity as shown in FIG. 5C, the induced field in a wire is non-helical having a uniform longitudinally extending magnitude and direction as shown in FIG. 12.

As best seen in FIGS. 2 and 3, the magnetizable wires 80, through the induced helical magnetic field such as that shown by helix 92 in FIG. 7, as well as the placement of the helix within the toner layer 85 generated about the outer periphery of the upper toner drum 78, causes the generation of corresponding helical ridges of toner 98 which have a shape corresponding to the magnetic helix 92. Thus, a series of toner ridges are generated which sweep in a counterclockwise direction up toward the recording tape loop 12 thereby generating a fluidized bed of toner particles, shown generally as 100 that effectively sweep, squeeze, and tumble across the entire area of the recording tape as it passes the magnetizable wires 80. The confronting relationship of the toner ridges along the entire lower surface of recording tape 12 allows each of the magnetized regions of the tape, corresponding to a desired UPC bar pattern to attract toner particles.

It has been experimentally found that the use of the magnetizable wires 80 not only generates ridges of toner 98, but also that the toner forms aglomerates or magnetic loops of approximately 0.004 inch which enhance the apparent toner size when the toner particles are attracted to the magnetized region of the recording tape The application or decorating of toner to the magnetized regions of the tape loop is further enhanced if the toner agglomerates approximate the flux reversal width of the magnetized tape, which in the preferred embodiment of the present invention is 0.004 inch, as discussed supra.

Furthermore, the magnetizable wires 80 effectively shield the magnetized recorded areas of the recording tape 12 from the peripheral sheet magnets of the upper toner drum 78 so as to allow the recording tape to attract toner particles while being undisrupted by these magnets. Also, by using a plurality of magnetizable wires 80, a series of magnetic ridges of toner particles are generated which effectively insures that there will be sufficient toner particles available for all recorded areas of the tape even though toner particles from one ridge have been attracted to a magnetized region of the tape.

In an alternate version of the upper toner drum shown in FIG. 5B, the drum has a magnetized surface of one polarity. Since the magnetic field extending above the drum is not uniform, rotation of the drum will generate a time-variant magnetic field at each point for a wire 80 placed above the drum. It is this time-variant magnetic field that generates the ridge of toner 98 as well as their sweeping movement. For the drum shown in FIG. 5B, the ridge is linear along the length of the wire and sweeps to the left and right as shown by vectors 99.

Consequently, the present toner applicator uniquely solves a problem found on prior art magnetic printers for it presents an excessive amount of toner to the magnetized area of the recording tape to insure complete and uniform application of toner particles to the magnetized regions of the recording tape without adversely affecting these magnetized regions by influence of exterior magnetic fields.

It has been found that the sweeping motion of the magnetic ridges 98 in the direction shown in FIG. 7 by arrow 94 with respect to the magnetic field 92, is dependent upon the length of the sheet magnets 86 as well as the rotational speed of the upper toner drum 78. Although the speed of the toner ridges is not cricital, they must be sufficiently fast for a complete sweeping of each magnetized area of the tape as it passes the magnetizing wires 80. For a tape speed of 8 inches per second, and sheet magnet length of ⅛ inch, it has been found that the preferred rotational speed of the upper toner drum is approximately two revolutions per second.

It has been experimentally found that some toner particles may, due to the magnetic effect of the toner particles themselves, bridge unmagnetized portions of the recording tape and adhere to other toner particles. These particles are not securely affixed to the recording tape and it has been found that they may be removed from the recording tape by passing the tape about a sharp corner 18 while simultaneously causing a gentle sheet of air to be directed at the tape at an acute angle by an air knife 102, as shown in FIG. 1. The corner 18 preferably has a 1/16 inch radius of curvature. The air knife has a longitudinal slit 103 having a length at least equal to the width of tape 12. The slit is positioned at a 23° angle with respect to the horizontal tape and at a 3/32 inch distance from the tape, having an air flow of approximately 8 cubic feet per minute and thereby generating a 12 p.s.i. pressure against the tape loop. A lower air pressure and flow of air may be used if the air knife is closer to the tape. The removed toner particles are then free to fall back into reservoir 40 for later use. Following the air knife cleaning of the recording tape, the residual toner particle image remaining on the recording tape accurately corresponds to a mirror image of the desired UPC bar pattern generated by either the keyboard 70 or automatic encoding device 72. A typical mirror image of the UPC symbol is shown in FIG. 6B and corresponds to the region of tape following cleaning by the air knife 102.

Following the cleaning of the magnetized toner image as shown in FIG. 6B, the tape loop advances to drive capstan 16. Directly opposite drive capstan 16 is a transfer pinch roller 104. Since the location of the magnetized toner UPC bar pattern image on the tape loop is precisely known due to the timing sensing signals 106, and since the location of the labels 34 upon label backing strip 36 is precisely known due to a label photo sensor 108 due to label sensing signal 110, the precise registration and centering of the uppermost label 112 with the toner bar pattern on tape loop 12 is obtained. When the toner bar pattern on the tape loop is precisely placed in registration with the uppermost label 112, transfer solenoid 114 is energized by a transfer output signal 116 from controller 58. This output signal is part of the output signals 64. Due to lever arm 118 and pivot 120, the transfer roller 104 urges toward drive capstan 16 causing the mechanical transfer of toner particles corresponding to the desired bar pattern to the uppermost label 112. Movement of the backing strip 36 is controlled by clutch 109 energized by clutch output signal 111. The clutch provides mechanical interconnection between motor 126 and label capstan 113 through belt 117.

As the uppermost label is moved upward and squeezed between transfer roller 104 and drive capstan 16, the backing strip is peeled away from the label 34 due to the small radius of curvature of transfer roller 104. The uppermost label is then brought in contact with a conveyor belt chain 122 which is driven by capstan 124 that in turn is driven by motor 126 through conveyor 128. The conveyor belt chain moves at a substantially uniform rate and causes the label with the deposited toner image of the desired UPC bar pattern to pass in front of a radiant heater 130 so as to fuse and fix the toner particles' resinous material into the label, thereby forming a permanent, non-smudging, abrasive resistant printed label.

Since the fixing of the toner particles by radiant heater 130 is independent of the tape loop movement 12 as well as the label backing strip 36, precise fusing of the toner is obtainable without affecting the overall timing of the magnetic printer. It should be noted however, that in alternate versions of the present invention, it is possible to allow the label to remain on the label backing strip and to pass both the label and the backing strip through the radiant heater area. Although this alternate version is plausible, it requires that either the labels be spaced at much greater distances on the backing strip or that the backing strip be moved in both a forward and reverse direction so as to bring the labels that do not have transferred images on them back below the entrance of the heater for later image transfer.

In the preferred embodiment of the present invention, after fixing of the toner particles to the label, the label may be replaced onto the backing strip by pinch rollers 132 and 134. Roller 132 is actuated by clutch 135 and driven by belt 137 so as to reattach the label to the backing strip. The label may then be removed from the backing strip for placement onto a food item. Alternatively, the label after exiting from the radiant heater area may simply be transferred to a second conveyor loop (not shown) for removal from the magnetic printer and placement onto a food item.

Figure 8:
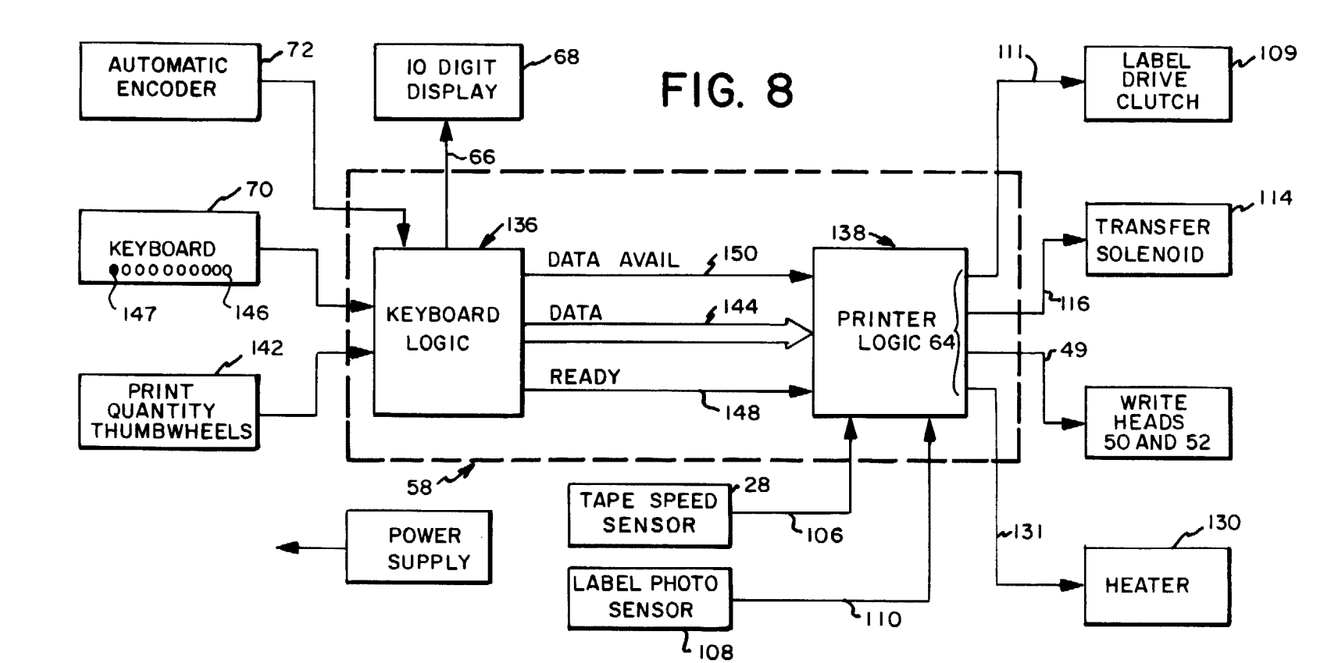
FIG. 8 is an overall block diagram of the electronic portion of the magnetic printer of FIG. 1.

The electronic circuitry employed by the present invention to properly synchronize all the functions of the magnetic printer are best seen in FIGS. 1, 8, 9, 10 and 11. As best seen in FIG. 8, the controller 58 incorporates a keyboard logic module 136 and a printer logic module 138. As shown in FIG. 1, the controller retrieves sensing signal 60, print quantity thumbwheel sensing signals 140, and print data 62 so as to generate output signal 64 for the proper synchronization of all the functions of the magnetic printer. The energization of motors 20 and 126 may be performed whenever the printer is on, regardless of the other functions of the printer. The tamper 41 may similarly be periodically energized.

A first of these functions is the writing of data by the magnetic writer 48 in response to either print data generated by keyboard 70 or by automatic encoder 72. As discussed earlier, the keyboard 70 may be used to manually insert the desired numbers for a UPC bar pattern or these numbers may be automatically generated by the automatic encoder 72 in response to some parameter of an item such, as its weight as indicated by a grocery scale (not shown). Regardless of the method of generation of the print data, the print data is transferred to the keyboard logic module 136 of the controller 58.

Also retrieved by the keyboard logic module 136 are the print quantity sensing signals 140 from the print quantity thumbwheel 142. The number generated by the print quantity thumbwheel indicates the number of duplicate printed labels corresponding to a desired UPC symbol. Thus, it is not necessary for the operator of the present machine to reinsert a repetitious UPC symbol since he or she may generate it once and indicate the number of times it is to be duplicated. In this situation, the printer rewrites the data at the proper time on the tape loop 12 so that consecutive labels on the backing strip 36 receive this desired UPC symbol from the tape loop 12. Alternately, the data is written once onto the magnetic tape loop 12 and the system is timed so that the magnetized image on the tape loop is re-tonerized by the magnetic toner applicator 74, consequently causing consecutive labels to be imprinted with the desired UPC bar pattern.

As shown in FIG. 8, the keyboard logic module 136 generates a 10 digit display on a display 68 which indicates to the user the central 10 digits of the UPC symbol. This allows the user to verify the inputted data. The keyboard logic module also stores incoming print data until the eleven digits have been obtained and transfers this print data to the printer logic module 138, by data lines 144 after the operator has depressed the print button 146; provided that, a ready signal 148 from the printer logic module 138 has been received. This ready signal indicates to the keyboard logic that the last digit transferred to the printer logic has been successfully written onto the magnetic tape and thus indicates that further data may be written onto the magnetic tape. Transferral of the data on data lines 144 to the printer logic 138 is initiated with the generation of a data available signal 150 from the keyboard logic which actually initiates the printer logic to accept the data on the data lines 144. A clear button 147 causes the termination of all printing.

Figure 9:
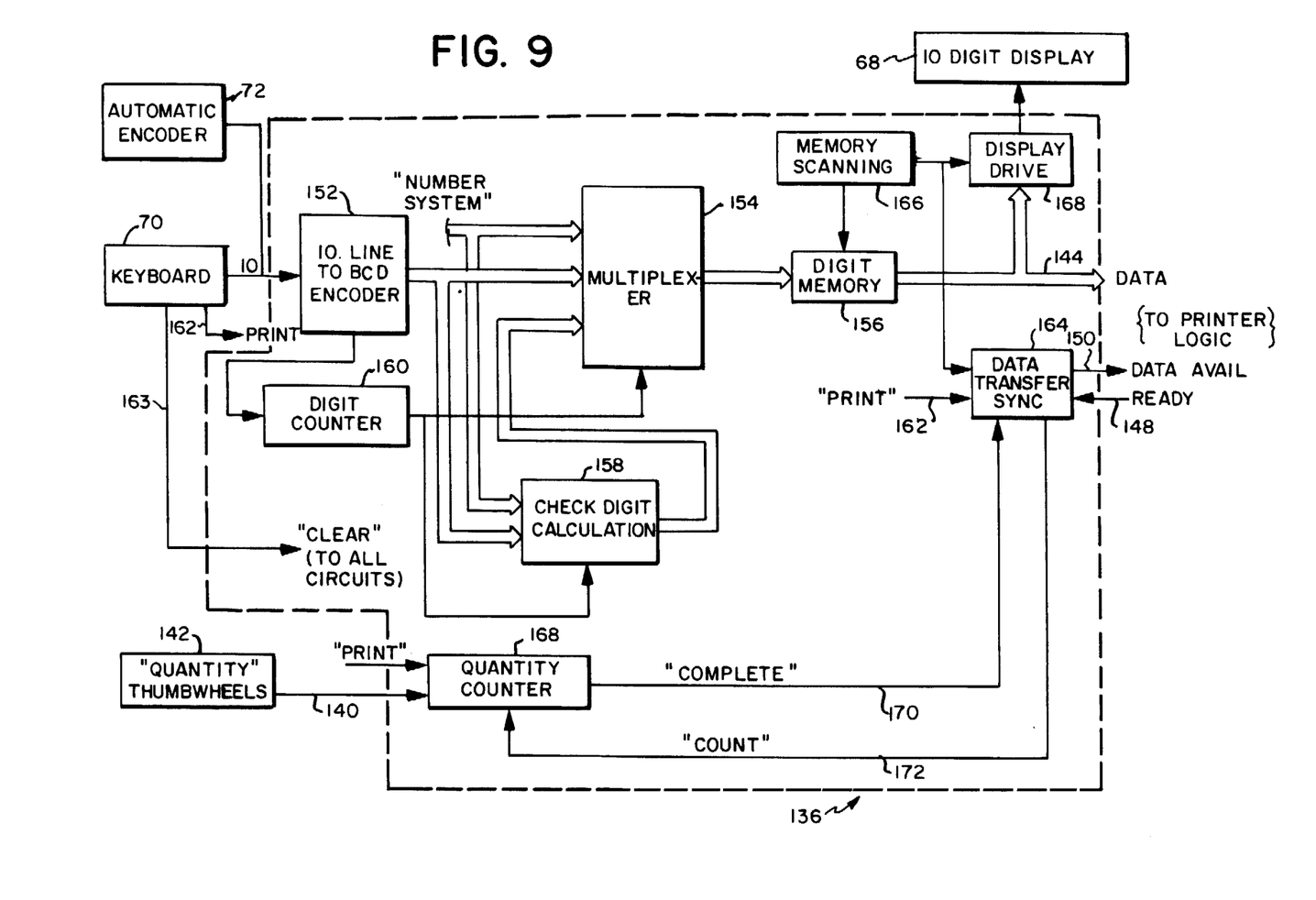
FIG. 9 is a block diagram of the keyboard logic module of FIG. 8.

As best shown in FIG. 9, the keyboard logic module 136 incorporates a 10-line to BCD encoder 152 for converting serial data from either the keyboard 70 or the automatic encoder 72 into binary coded decimal data. The output of the 10-line BCD encoder 152 is transferred to a multiplexer 154 where the data is stored in parallel form for later transferral to digit memory 156. the 10 digits transferred to the 10-line BCD encoder 152 represent the ten digits of the UPC symbol corresponding to the product's manufacturer and the information corresponding to the particular product sold, as discussed fully in the UPC Symbol Specification of May, 1973. As there indicated, two other digits are normally displayed in the UPC symbol pattern, the first digit being a number system digit indicating to the computer reading the UPC symbol, the number system to be emloyed with respect to the next 10 digits. The second other digit is modulo-10 digit for error verification of the received data.

The number system digit is received by multiplexer 154 either from the keyboard 70 or from some other external source, or it may be permanently inserted within the multiplexer if variable numbering systems are not to be employed by the particular magnetic printer. The generation of the modulo-10 check digit is accomplished by transferring the data from the 10-line BCD encoder to a check digit calculation module 158 where the check digit is determined according to a mathematical format indicated in paragraph 2.1.3. of the UPC Symbol Specification of May, 1973. In order to perform this calculation, the check digit calculation module 158 must ascertain the particular digit being operated upon, which is obtained by a digit counter 160 coupled to the 10-line BCD encoder 152. The output of the digit counter is also transferred to multiplexer 154 for the proper parallel spacing of the digit signals.

A data transfer synchronizer 164 receives memory scanning information from a memory scanner 166 which provides for the scanning of the digit memory to both a display driver 168 and the data lines 144. The data transfer synchronizer also receives information from the quantity thumbwheels 142 which indicate the number of labels desired having an identical pattern. The quantity thumbwheel sensing signal 140 is transferred to a quantity counter 168 where a number is stored equal to the quantity thumbwheel number minus the numbers of labels already printed with the desired pattern. When this number reaches a zero count, a "COMPLETE" signal is generated on complete line 170 which is transferred to the data transfer synchronizer. The data transfer synchronizer in turn transfers a down "COUNT" signal on down count line 172 to the quantity counter for decrementing the count originally stored from the quantity counter sensing signal 140. The data transfer synchronizer energizes the data available signal 150 provided that the quantity counter does not energize the complete line 170 and further provided that a ready signal 148 has been received. Furthermore, a print signal 162 must be received by the data transfer synchronizer if data is to be transferred to the printer logic module on data lines 144.

Depression of clear button 147 generates a "CLEAR" signal 163 that is transferred to the controller 58 so as to terminate further printing.

Figure 11:
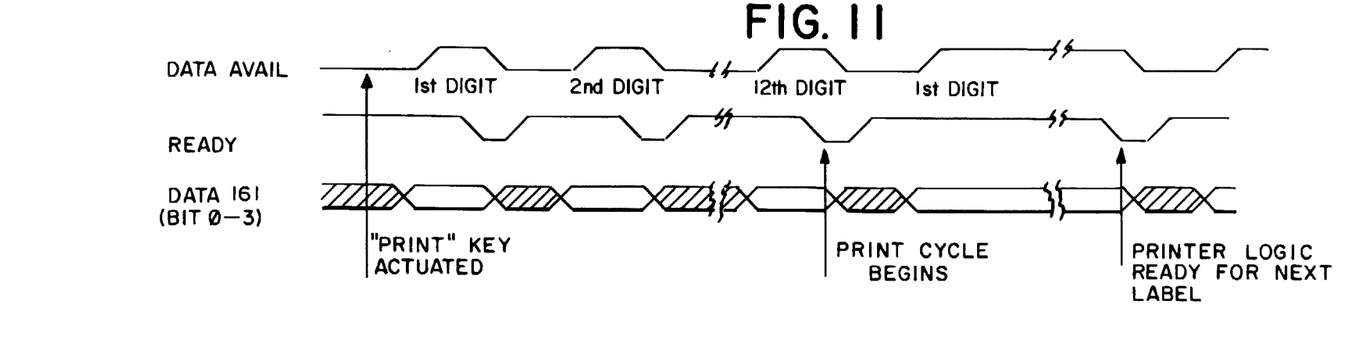
FIG. 11 is a timing chart of various signals generated by the electronic portion of the manetic printer of FIG. 1.

The time sequence for energization of data available signal 150 and ready signal 148 is best seen in FIG. 11. The energization of data available signal 150 is performed serially for each of the twelve digits. Data line 161 indicates that data is changing on data line 144 after the ready signal is received; provided that the data available signal is in the HIGH state when the ready signal drops to the LOW state.

Figure 10:
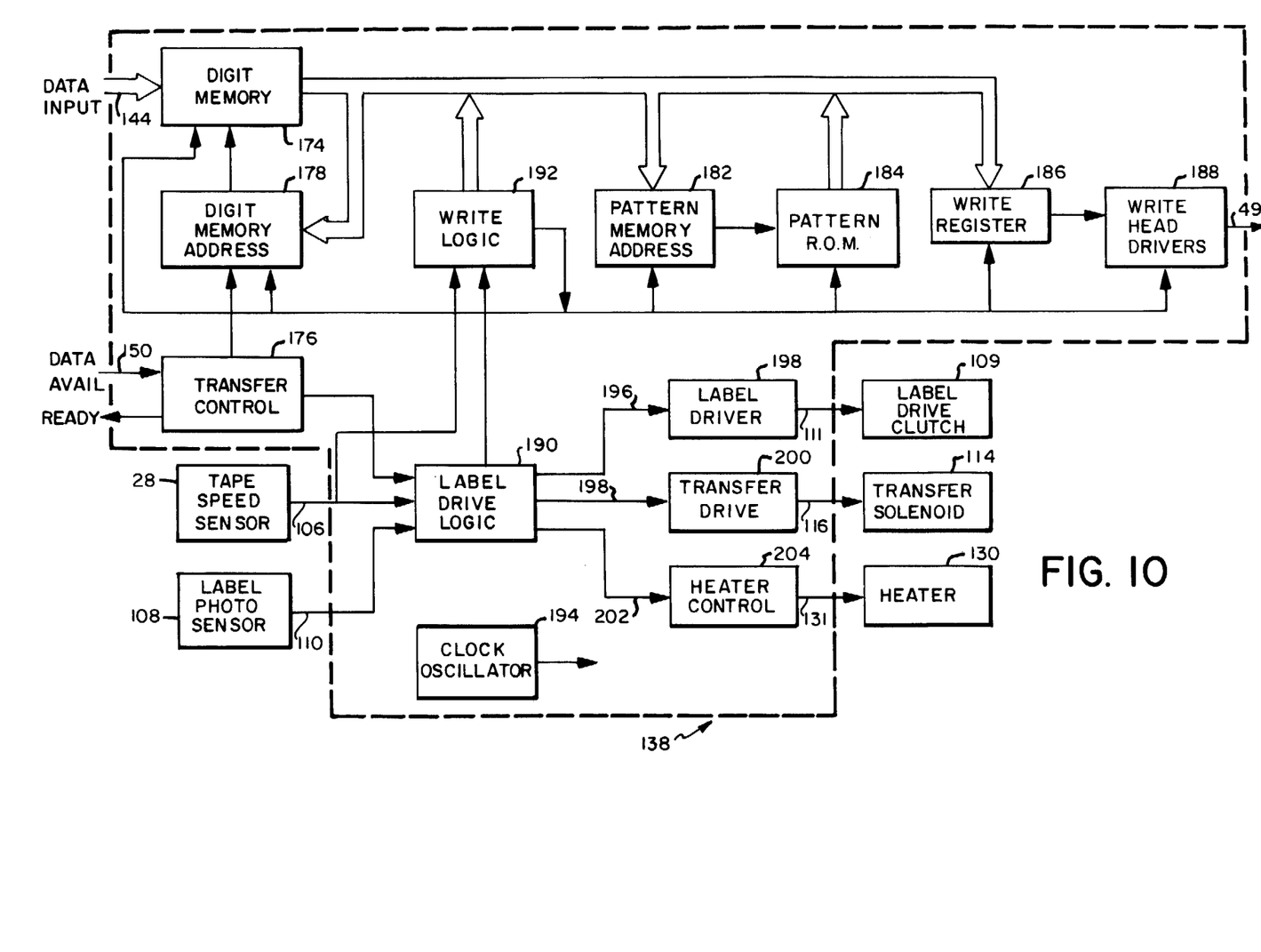
FIG. 10 is a block diagram of the printer logic module of FIG. 8.

As best seen in FIGS. 8 and 10, the printer logic module generates output signals 64 for the proper operation of the magnetic printer 10. One of the output signals is the clutch output signal 111 for driving clutch 109 which in turn drives the label backing strip through label capstan 113 and roller 115. The second output signal is the transfer output signal 116 which energizes transfer solenoid 114 for the transferral of toner from the magnetic tape to the label. A third output signal energizes magnetic writer 48 by properly energizing magnetic heads 50 and 52 from a write head output signal 49. A fourth output signal 64 is the heater output signal 131 which activates the radiant heater 130 during the times when a label is to be fused and de-energizes the heaters at other times so as to conserve energy as well as to prevent heat buildup within the magnetic printer. The printer logic module 138 receives recording tape speed signals from tape timing sensing signal 106 as well as a label sensing signal 110 from label photocenter 108.

The data input lines 144 are transferred to a digit memory 174 that stores the data input signals 144 and does not operate upon them until a data available signal is received. At such times, a transfer control module 176 indicates to a digit memory address module 178 that information may be written on the magnetic printer 48.

The digit memory address module 178 retrieves digits stored in the digit memory 174 in a sequential manner, transferring each coded digit via a data bus 180 to a pattern memory address module 182. The pattern memory address module 182 retrieves from a pattern read only memory (ROM) 184 the sequence of bar patterns for the particular digit as well as the pattern for energizing write heads 52 for generating the man-readable matrix digit. This information is transferred by the pattern ROM to a write register 186 where the information in turn enables the write head drivers 188 to drive write heads 50 and 52. Since the writing of information by the write heads 50 and 52 must be synchronized with the actual tape speed, the tape speed optical sensor 28 transfers its tape timing sensing signal 106 to a label drive logic module 190. This module also receives label sensing signal 110 from label photo sensor 108 so that initiation of the writing sequence is properly timed with respect to the distance of the uppermost label from the pinch roller 104. The label drive logic in turn transfers a signal to a write logic module 192 which insures the proper transferral of the pattern read only memory for the digit to be written to the write register. This insures that a bar code having the proper width for each digit of the 12-digit pattern is obtained.

As indicated earlier, each digit is represented by two dark and two light spaces of which the four total spaces equal seven data modules, each module in the present embodiment having a width of 0.012 inches. A bar may be made up of from one to four dark modules and therefore may have a width of 0.012, 0.024, 0.036, or 0.048 inches. The longitudinal write head 50 of the present invention generates three flux reversals for each bar module and therefore generates a flux reversal every 0.004 inch if a dark module is required. Therefore, for every dark module required by the pattern read only memory, three flux reversals are generated by the elongated write head 50. This corresponds to the timing pulse generated for every 0.004 inch movement of the tape loop. The pattern ROM 184 also contains the matrix pattern for the digit to be magnetically written. This matrix pattern causes the matrix write heads 52 to generate flux reversals in a matrix pattern that spacially represents the digit. These write heads are thus selectively energized as the tape moves every 0.004 inch to form a series of dots representing the desired digit.

The clock oscillator 194 is coupled to the logic module blocks so as to insure that the write heads are energized for a precise amount of time to insure the proper widths for each dark module comprising a dark bar. The oscillator also drives the memory scanning module 166, shown in FIG. 9.

The label drive logic module 190 also generates a clutch activation signal 196 for activating label driver 198 which in turn generates the clutch output signal 111 for driving the label drive clutch 109. The clutch activation signal 196 is generated at a predetermined time so that the label will be in registration with transfer roller 104, tape drive capstan 16 and the tonerized image on the tape loop.

The label drive logic module 190 also generates a transfer activation signal 198 for activating a transfer drive 200 which in turn energizes a transfer output signal 116 for driving transfer solenoid 114. The generation of transfer activation signal 198 is timed so as to activate the transfer roller 104 at the time of proper registration of the uppermost symbol 112 (see FIG. 1) between transfer roller 104 and tape drive capstan 16.

Finally, label drive logic module 190 generates a heater activation signal 202 for energizing a heater control 204 which in turn generates a heater output signal 131 for energizing radiant heaters 130. The heater activation signal 202 is generated at the time when the uppermost label is being transferred to the conveyor belt chain 122 for placement in registration with radiant heater 130.

Thus, what has been described is a magnetic printer for printing bar patterns that incorporates unique timing circuitry for accurately writing data onto a loop of recording tape so as to properly space the bars of the bar code pattern onto the magnetic tape. Furthermore, the magnetic printer incorporates a toner applicator which utilizes a series of magnetizable wires interposed between the magnetic tape and a toner drum which in cooperation with the toner drum and the magnetic dipoles placed about the periphery of the toner drum generate rotating or sweeping ridges of toner material which impinge upon the lower surface of the tape so as to deposit toner particles about those regions of the tape which have been magnetized in accordance with the desired bar code pattern. The magnetic printer further incorporates an air knife for removing toner particles which are not in close contact with magnetized portions of the tape and accurately transfers this cleaned toner image of the desired bar code to a label via a transfer pinch roller device and thereafter fuses these toner particles onto the labels thereby forming an abrasive resistant smudge proof label corresponding to a desired bar code pattern.

It will thus be seen that the objects set forth above, among those made apparent from the preceding description, are efficiently attained and, since certain changes may be made in carrying out the above method and in the apparatus set forth without departing from the scope of the invention, it is intended that all matter contained in the above description or shown in the accompanying drawings shall be interpreted as illustrative and not in a limiting sense.

It is also to be understood that the following Claims are intended to cover all of the generic and specific features of the invention herein described, and all statements of the scope of the invention which, as a matter of language, might be said to fall therebetween.

I claim:
1. A magnetic printer comprising:
   A. means for receiving data to be printed;
   B. a magnetic recording medium;
   C. means for driving said recording medium;
   D. means, disposed in operative association with the recording medium for generating a timing signal corresponding to the speed of the medium;
   E. writing means disposed in operative association with the recording medium and operating in response to the timing signal of the recording medium speed timing means, for magnetically writing the received data on said recording medium;
   F. means, in operative association with the recording medium for applying a magnetic toner to the magnetically written portions of the recording medium, said toner application means incorporating;
      1. a toner reservoir,
      2. at least one rotatable toner drum communicating with the toner reservoir and in proximity with the recording medium, having a magnetized outer periphery forming a circumferentially nonuniform magnetic field, said field attracting a layer of magnetic toner about the outer periphery of the drum, and
      3. at least one magnetizable member positioned between the recording medium and the toner drum for mechanically and magnetically interacting with the toner drum and the toner layer for generating a moving ridge of toner between the magnetizable member and the recording medium corresponding to an induced magnetic field in the magnetizable member by the nonuniform magnetic field on the toner drum, so that the recording medium attracts toner at each magnetically written area along the medium;
   G. a data recording material for permanently recording said received data; and
   H. transfer means interacting with the data material, and the toner applied portions of the recording medium, for transferring the toner applied to the recording medium to the data recording material.

2. A magnetic printer as defined in claim 1, further comprising:
   K. an air knife spaced between the toner application means and the transfer means, having an air slit facing toward and parallel to the recording medium, for removing excess toner from the medium.

3. A magnetic printer as defined in claim 1, wherein the magnetic toner application means further comprises:
   4. a tapping device connected to the toner reservoir for periodically impacting said toner reservoir so as to maintain the toner in the form of a uniform bath.

4. A magnetic printer as defined in claim 1, wherein the ridge of toner generated along each magnetizable member forms agglomerates of toner, and wherein the means for magnetically writing data on the recording medium incorporates magnetic writing heads for generating magnetic flux reversals on the recording medium having a width approximately equal to the width of the toner agglomerates, thereby enhancing the attraction of the toner agglomerates to the magnetically written portions of the medium.

5. A magnetic printer as defined in claim 1, wherein the magnetizable member of the toner application means comprises at least four magnetizable wires parallel to each other, parallel to the axis of the toner drum, and parallel to the confronting surface of the recording medium.

6. A magnetic printer as defined in claim 1, wherein the magnetized outer periphery of the toner drum of the toner application means comprises a plurality of sheet magnets around said periphery.

7. A magnetic printer as defined in claim 6, wherein the magnetizable member of the toner application means comprises at least two magnetizable wires parallel to each other and spaced from each other at a distance approximately equal to the length of said sheet magnets.

8. A magnetic printer as defined in claim 6, wherein said sheet magnets are arranged in a helix about the toner drum.

9. A magnetic printer as defined in claim 1, wherein the transfer means comprises:
   a. a pair of rollers respectively positioned along nonadjacent surfaces of the data recording material and the recording medium, and
   b. means for engaging said rollers toward each other so as to mechanically transfer the toner applied on the recording medium to the data recording material.

10. A magnetic printer as defined in claim 1, wherein the data recording material comprises a backing sheet and a series of labels sequentially spaced thereon.

11. A magnetic printer as defined in claim 10, further comprising means for removing a label from the backing sheet after transferral of toner to the label.

12. A magnetic printer as defined in claim 1, further comprising:
 I. means for fixing the toner to the data recording material.

13. A magnetic printer as defined in claim 12, further comprising a backing sheet, a series of labels sequentially spaced thereon, means for removing the label from the backing sheet after transferral of toner to the label, and means for re-attaching the label to the backing sheet after the label exits from the fixing means.

14. A magnetic printer as defined in claim 1, wherein the recording medium is a loop of magnetic tape.

15. A magnetic printer as defined in claim 1, wherein the magnetizable member is a wire.

16. An improved magnetic printer of the type having:
 A. means for receiving data to be printed,
 B. a magnetic recording medium,
 C. means for driving the recording medium,
 D. writing means disposed in operative association with said recording medium, for magnetically writing the received data on the medium,
 E. a magnetic toner applicator for applying magnetic toner to the magnetically written portions of the recording medium,
 F. a data recording material for permanently recording the received data, and
 G. transfer means interacting with the data material and the toner applied portions of the recording medium for transferring the toner on the medium of the data recording material,
wherein the improvement comprises an improved magnetic toner applicator having,
 1. a toner reservoir,
 2. at least one rotatable toner drum communicating with the toner reservoir and having a magnetized outer periphery emanating a non-uniform magnetic field at any point in close proximity to the drum periphery as the drum rotates, said periphery attracting a layer of magnetic toner about the periphery of the drum, and
 3. at least one magnetizable wire positioned between the recording medium and the toner drum for magnetically interacting with the toner drum and the toner layer for generating a moving ridge of toner between the wire and the recording medium corresponding to an induced magnetic field in the wire by the non-uniform magnetic field emanating from the toner drum, so that the recording medium encounters at least one ridge of toner at each magnetically written portion on the medium and thereby attracts toner to said portion.

17. An improved magnetic printer as defined in claim 16, wherein a plurality of said magnetizable wires are positioned parallel to each other and substantially parallel to the axis of the toner drum.

18. An improved magnetic printer as defined in claim 17 wherein the magnetized outer periphery of the toner drum of the toner application means incorporates sheet magnets having their poles aligned along the outer periphery.

19. An improved magnetic printer as defined in claim 18, wherein the sheet magnets are arranged in a helix about the toner drum, with spaces between adjacent magnets along the length of the helix.

20. An improved magnetic printer as defined in claim 18, wherein said sheet magnets are of equal length and the plurality of wires are spaced from each other at a distance approximately equal to the length of the sheet magnets.

21. An improved magnetic printer as defined in claim 17, wherein the ridge of toner generated along each magnetizable wire forms agglomerates of toner, and wherein the means for magnetically writing data on the recording medium incorporates magnetic writing heads for generating magnetic flux reversals on the recording medium having a width approximately equal to the width of the toner agglomerates, thereby enhancing the attraction of the toner agglomerates to the magnetized flux reversals areas of the recording medium.

22. An improved magnetic printer as defined in claim 21, wherein the toner agglomerates have a size approximately equal to a module width used to generate bars of a bar code pattern.

23. An improved magnetic printer as defined in claim 16, wherein the improvement further comprises:
 H. means, disposed in operative association with the recording medium and interconnected with the writing means, for generating a timing signal corresponding to the speed of the tape so that the data to be printed is magnetically written on the recording medium in a precise, uniform fashion.

24. An improved magnetic printer as defined in claim 23, wherein the writing means incorporates magnetic writing heads, a first of said writing heads having an elongated shape for magnetically generating flux reversals corresponding in length to a desired bar pattern, represented by the received data and a second plurality of matrix writing heads for generating a matrix of flux reversals representing a man-readable form of the received data.

25. An improved magnetic printer as defined in claim 16, wherein the improvement further comprises;
 I. an air knife spaced between the toner application means and transfer means, having an air slit, the outer end of which is parallel to the slit faces toward the recording medium at an acute angle, for removing excess toner from the recording medium.

26. An improved magnetic printer as defined in claim 25, wherein the recording medium is magnetic tape and the air knife further comprises an arm member having an edge with a small radius of curvature positioned against the side of the tape opposite the air slit so as to have the tape make a rapid change in direction at the edge and thereby facilitate removal of excess toner.

27. An improved magnetic printer as defined in claim 16, wherein the data recording material comprises a series of pressure sensitive adhesive labels sequentially spaced on a backing sheet, wherein the transfer means further comprises means for causing the backing sheet to pass a sharp radius of curvature after transferral of toner to a label by the transfer means, and wherein the improved printer further comprises:
 H. an improved means for fixing the toner to the data recording material, incorporating an endless belt for receiving the peeled label and passing it through the fixing means, whereby the toner on the label is fixed thereto asynchronously with respect to the motion of the recording medium.

28. A magnetic printer comprising:
A. means for receiving data to be printed;
B. a magnetic recording medium;
C. means for driving said recording medium;
D. means, disposed in operative association with the recording medium, for magnetically writing the received data on said recording medium;
E. means, disposed in operative association with the recording medium, for applying a magnetic toner to the magnetically written portions of the recording medium;
F. a data recording material incorporating a plurality of labels sequentially spaced upon a backing strip;
G. transfer means interacting with the data material and the toner applied portions of the recording medium for transferring the toner applied to the recording medium to a label of the recording material and for simultaneously removing the label from the backing strip; and
H. means for fixing the toner to the label after removal of the label from the backing strip;
whereby the fixing of the toner to the label may be asynchronously performed with respect to both the magnetic writing of data on the recording medium as well as the transfer of toner on the labels.

29. A magnetic printer comprising:
A. means for receiving, encoding and processing data to be printed;
B. a magnetic recording tape loop;
C. means for driving said tape loop about a predetermined path;
D. means, disposed in operative association with the tape loop, for generating a timing signal corresponding to the speed of the tape loop;
E. writing means disposed in operative association with the tape loop and operating in response to the timing signal of the tape speed timing means, for magnetically writing the received, encoded, and processed data on said tape loop;
F. means, in operative association with the tape loop, for applying a magnetic toner to the magnetically written portions of the tape loop, said toner application means comprising:
   2. a toner reservoir,
   2. at least one rotatable toner drum communicating with the toner reservoir and in proximity with the tape loop, having a magnetized outer periphery forming a circumferentially non-uniform magnetic field, said field attracting a layer of magnetic toner about the outer periphery of the drum; and
   3. at least one magnetizable wire positioned between the tape loop and the toner drum for mechanically and magnetically interacting with the toner drum and toner layer for generating a moving ridge of toner between each wire and the tape loop corresponding to an induced magnetic field in the wire by the non-uniform magnetic field of the toner drum, so that the tape loop attracts toner at each magnetically written area along the tape loop;
G. a data recording material for permanently recording said received data;
H. transfer means interacting with the data material, and the toner applied portions of the tape loop, for transferring the toner applied to the tape loop to the data recording material;
I. means for fixing the toner to the data recording material; and
J. means, disposed in operative association with said recording tape for erasing data recorded thereon.

30. An improved method of magnetic printing of the type having the steps of:
A. receiving, encoding, and processing data to be printed;
B. magnetically writing the process data onto a magnetic recording tape;
C. applying toner to the magnetically written portions of the tape;
D. transferring the toner on the magnetically written portions of the tape to a data recording material; and
E. fixing the toner to the data recording material,
wherein the improvement comprises improved magnetic toner applicating, further incorporating the steps of,
   1. generating an induced time variant magnetic field along the length of a magnetizable wire, and
   2. maintaining the wire in close proximity to and juxtaposed between a moving layer of toner and the magnetically written portions of the tape loop;
whereby a moving ridge of toner between the wire and the magnetically written portions of the tape corresponding to the induced magnetic field in the wire is generated so that the tape encounters at least one ridge of toner at each magnetically written portion of the toner and thereby attracts toner to the said portion.

31. An improved method of magnetic printing as defined in claim 30, wherein the improvement further comprises:
F. blowing air at the tape at an acute angle so as to remove loosely adhered toner particles from the tape that are deposited during the application of toner to the magnetically written portions of the tape.

* * * * *